United States Patent [19]

Kelm et al.

[11] Patent Number: 4,535,036

[45] Date of Patent: Aug. 13, 1985

[54] MULTI-CELL POWER SUPPLY

[75] Inventors: Roger W. Kelm, New Richmond, Wis.; Glenn W. Merry, St. Paul; William J. McArthur, Maple Grove, both of Minn.

[73] Assignee: Duracell Inc., Bethel, Conn.

[21] Appl. No.: 617,217

[22] Filed: Jun. 4, 1984

[51] Int. Cl.³ .............................................. H01M 2/10
[52] U.S. Cl. .................................... 429/99; 429/149; 429/185
[58] Field of Search ................ 429/99, 100, 96, 97, 429/98, 48, 9, 149, 176, 185

[56] References Cited

U.S. PATENT DOCUMENTS 4,389,469 6/1983 Nicholls .......................... 429/99 X
4,431,717 2/1984 Kikuchi ............................. 429/100
4,443,524 4/1984 Meinhold ............................ 429/99

Primary Examiner—Charles F. LeFevour

[57] ABSTRACT

The present invention relates to a portable electrical power source comprising housing means adapted to fit within a cell cavity of a battery-powered device, said housing means having positive and negative electrical contact means adapted to form electrical connection with corresponding positive and negative contact means of said device; a plurality of button cells disposed within said housing means, at least one of said button cells being electrically connected to said contact means and at least 50 percent of said button cells being insulated from any electrical connection to said contact means.

19 Claims, 2 Drawing Figures

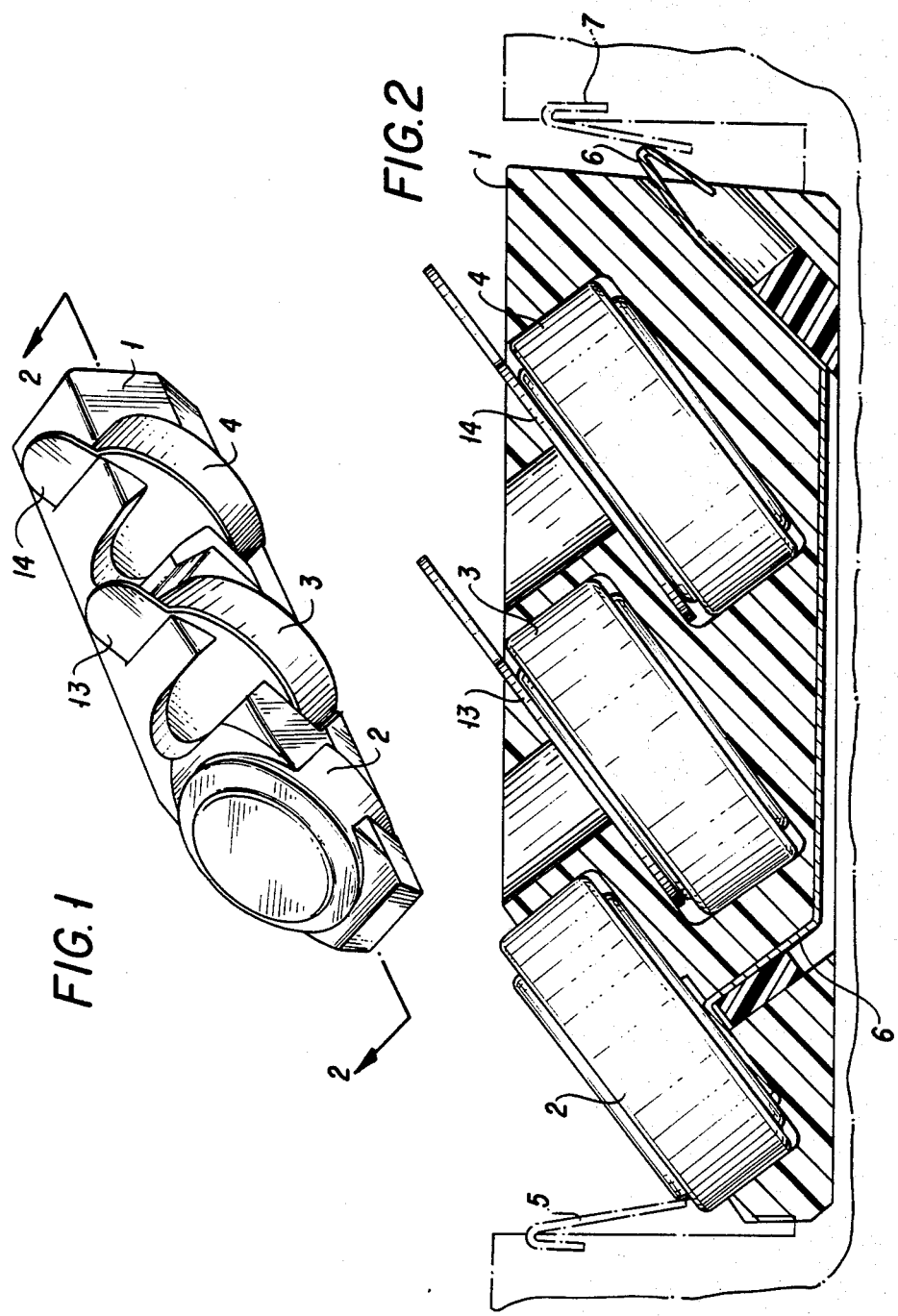

MULTI-CELL POWER SUPPLY

BACKGROUND OF THE INVENTION

The present invention relates to a portable electric power source useful in operating battery powered devices and having particular utility in the operation of devices of an emergency type nature, such as for example paging devices.

In recent years the use of portable paging devices by business and service personnel as well as doctors, volunteer firemen and others subject to emergency calls, has substantially increased. In addition to the wider use of such devices, the devices themselves have become smaller, lighter, and more versatile, to the point where they no longer merely alert the carrier to the fact that he has a call, but can even provide the number to which he is to respond.

As such devices have become more compact, the power supply has also, out of necessity, had to be reduced. Such devices now typically operate on a single standard AA cell. Unfortunately, there is no way to determine the useful life remaining in the cell at any given time. This can create a serious, even life threatening problem, i.e. the doctor whose pager has become inoperative, being out of touch with his emergency service until he is able to obtain a new battery. This can leave a doctor or other individual out of communication for a relatively long, potentially critical period of time.

DRAWINGS

FIG. 1 is an exploded view of one of the preferred embodiments of the present invention.

FIG. 2 is a cross-section on the line 2—2 of the embodiment illustrated in FIG. 1.

SUMMARY OF INVENTION

The present invention provides a portable electrical power source comprising housing means adapted to fit within the cell cavity of a battery-powered device, said housing means being adapted to form electrical connection with corresponding positive and negative contact means of said device; a plurality of button cells disposed within said housing means, at least one of said button cells being electrically connected to said contact means and at least 50 percent of said button cells being insulated from any electrical connection to said contact means.

Once a device has been loaded with the power source of the present invention there is present in the device at least one complete fresh power source, over and above that being put into use, so that in case of failure, the user can immediately render his device operative and re-establish communication.

PREFERRED EMBODIMENT

While the invention will be described with specific reference to a particular preferred embodiment, it will be understood that this is only one preferred embodiment, and that the discussion and description are therefore by way of illustration and not by way of limitation.

One preferred embodiment of the present invention is illustrated in FIGS. 1 and 2. The illustrated embodiment is adapted to fit within the cell cavity of a battery operated paging device designed to be operated using a single AA cell. In the drawing the housing 1 contains three button cells 2, 3, and 4, cell 2 being electrically connected to positive contact means 5, and through connecting means 6 to negative contact 7. Cells 3 and 4 are insulated from any electrical connection to contact means 5 or 7. As illustrated in FIG. 2, contacts 5 and 7 are part of the device being powered (shown in fragmented outline).

The illustrated embodiment is particularly adapted to contain three standard #630 zinc air button cells, having a maximum diameter of 15.62 mm, a maximum thickness of 6.05 mm, a typical minimum open circuit voltage of 1.45/1.35 volts, a capacity of 950 mAh, and a weight of approximately 3.62 g. Where metal air cells are employed, it is desirable to prevent air from passing into the cell during the period it is insulated from connection to contacts 5 and 7. This is best accomplished by using conventional adhesive seal means designated 13 and 14 in FIGS. 1 and 2.

The housing may be formed from any suitable material such as metal or plastic. Plastic is generally preferable however, not only from the point of view of cost and the minimizing of weight, but also because it simplifies the problems of insulating the electrical contacts.

A premium alkaline AA cell is usually empirically rated as having a useful life of approximately 1700 mAh. The actual life of the cell is of course a function of the device in which it is employed, and in paging devices, the actual useful life of such a premium alkaline cell is approximately 1000 mAh (to the point of 0.9 v). Each of the button cells in the preferred embodiment of the present invention is capable of delivering approximately 950 mAh of useful life. Thus, in pager applications the preferred embodiment of the present invention provides not only two spare cells, but a total useful life over 50 percent greater than the maximum empirical life of a AA cell and almost three times the actual observed life of the single AA cell which the present invention replaces.

While the present invention has been described with particular reference to the use of zinc air cells, it will be understood that other types of button cells, i.e. silver oxide zinc or mercury oxide zinc could be employed in place of zinc air type cells. Also the device can be sized to replace other standard size cells such as AAA cells or C cells for example. It will also be understood the specific configuration of the preferred embodiment described in FIG. 1 could be adapted, as necessary, to fit the available space in the cell cavity of a particular battery-powered device.

FIG. 2 of course illustrates the preferred device of the present invention in which the operative cell 2 is positioned within the housing means so as to directly contact the positive contact means of the battery-powered device. Thus, in the embodiment of FIG. 2, when the power source is in place in the cell cavity, the operative cell 2 is in direct electrical contact with the positive contact of the battery-powered device, and through connecting means 6 it is in electrical contact with negative contact means 7 through which it is connected to corresponding negative contact means in said battery-powered device. It will be obvious that a separate connecting means could be employed to provide electrical contact between the positive contact of the device and the positive contact surface of cell 2.

It will be obvious that a still further embodiment would be the converse of that described in FIG. 2, wherein said operative battery would be in direct electrical contact with the negative contact means of the battery operated device and contacted through connecting means 6 to a positive contact means in the housing. In a yet further embodiment, two or more button cells might be connected in series to provide higher voltage i.e. 3, 4, 5, or 6 volts etc.

It will be further understood that while the foregoing description has been particularly directed to the operation of devices such as emergency paging devices, the power source of the present invention has application in any device where it is essential or even merely desirable to have a spare power source immediately available.

It will of course also be obvious that still other changes, modifications and alterations can be made in the apparatus and methods herein described without departing from the scope of the invention herein disclosed and it is our intention to be limited only by the appended claims.

As our invention we claim:

1. A portable electrical power source comprising housing means adapted to fit within a cell cavity of a battery-powered device, said housing means having positive and negative electrical contact means adapted to form electrical connection with corresponding positive and negative contact means of said device; a plurality of button cells releasably disposed within said housing means, at least one of said button cells being electrically connected to said contact means and at least 50 percent of said button cells being insulated from any electrical connection to said contact means and to the button cells electrically connected to said contact means.

2. The power source according to claim 1 wherein said housing means is adapted to fit within a cell cavity designed to accommodate a standard AA battery.

3. The power source according to claim 2 wherein said housing is adapted to contain three cells.

4. The power source according to claim 3 wherein said cells are zinc air cells capable of delivering about 950 mAh of useful life.

5. The power source according to claim 3 wherein one of said cells is in electrical connection with said contact means, and two of said cells are insulated from electrical contact.

6. The power source according to claim 4 wherein one of said cells is in electrical connection with said contact means, and two of said cells are insulated from electrical contact.

7. The power source according to claim 4 wherein each of said cells insulated from electrical contact is also sealed to prevent passage of air into said cell.

8. The power source according to claim 5 wherein each of said cells insulated from electrical contact is also sealed to prevent passage of air into said cell.

9. The power source according to claim 6 wherein each of said cells insulated from electrical contact is also sealed to prevent passage of air into said cell.

10. The power source according to claim 5 wherein one of said positive and negative electrical contact means is the respective positive or negative can of the button cell.

11. The power source according to claim 6 wherein one of said positive and negative electrical contact means is the respective positive or negative can of the button cell.

12. The power source according to claim 1 wherein said housing contains at least four cells.

13. The power source according to claim 12 wherein one of said cells is in electrical connection with said contact means and three of said cells are insulated from electrical contact.

14. The power source according to claim 13 wherein each of said cells insulated from electrical contact is also sealed to prevent passage of air into said cell.

15. The power source according to claim 12 wherein two of said cells are in electrical connection with said contact means and two of said cells are insulated from electrical contact.

16. The power source according to claim 15 wherein said two cells in electrical connection are connected to each other in parallel.

17. The power source according to claim 16 wherein each of said cells insulated from electrical contact is also sealed to prevent passage of air into said cell.

18. The power source according to claim 15 wherein said two cells in electrical connection are connected to each other in series.

19. The power source according to claim 18 wherein each of said cells insulated from electrical contact is also sealed to prevent passage of air into said cell.

* * * * *